United States Patent
Park

(10) Patent No.: US 8,896,526 B1
(45) Date of Patent: Nov. 25, 2014

(54) SMARTWATCH AND CONTROL METHOD THEREOF

(71) Applicant: LG Electronics Inc., Seoul (KR)

(72) Inventor: Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/078,283

(22) Filed: Nov. 12, 2013

(30) Foreign Application Priority Data

Sep. 2, 2013  (KR) .......................... 10-2013-0105027

(51) Int. Cl.
*G09G 5/00* (2006.01)
*G04G 9/00* (2006.01)

(52) U.S. Cl.
CPC ........................................ *G04G 9/00* (2013.01)
USPC .......................................... 345/156; 345/418

(58) Field of Classification Search
CPC ............. G09G 5/00; G04C 23/14; G04G 9/00
USPC .......................................... 345/156; 368/251
See application file for complete search history.

(56) References Cited

U.S. PATENT DOCUMENTS

| 6,477,117 | B1 * | 11/2002 | Narayanaswami et al. ... | 368/251 |
| 2003/0085870 | A1 * | 5/2003 | Hinckley ...................... | 345/156 |
| 2004/0137963 | A1 | 7/2004 | Barras et al. | |
| 2006/0028429 | A1 * | 2/2006 | Kanevsky et al. ............ | 345/156 |
| 2010/0066763 | A1 * | 3/2010 | Macdougall et al. ......... | 345/656 |
| 2010/0245131 | A1 | 9/2010 | Graumann | |
| 2013/0163390 | A1 | 6/2013 | Gossweiler, III et al. | |

FOREIGN PATENT DOCUMENTS

| JP | 2002-277559 A | 9/2002 |
| KR | 10-2011-0067416 A | 6/2011 |

* cited by examiner

*Primary Examiner* — Said Broome
(74) *Attorney, Agent, or Firm* — Birch, Stewart, Kolasch & Birch, LLP

(57) ABSTRACT

A smartwatch and a control method thereof are disclosed. According to an embodiment, the smartwatch includes a tilt sensor unit configured to sense a tilt of the smartwatch; a display unit configured to display an image; and a processor configured to control the tilt sensor unit and the display unit, wherein, when a front of the display unit is directed in a predetermined direction, the processor is further configured to acquire, using the tilt sensor unit, a first rotation angle in a first direction when the smartwatch rotates in the first direction based on a rotation axis of the smartwatch and perform a first command corresponding to the first direction when the first rotation angle exceeds a first threshold angle.

21 Claims, 9 Drawing Sheets

FIG. 2
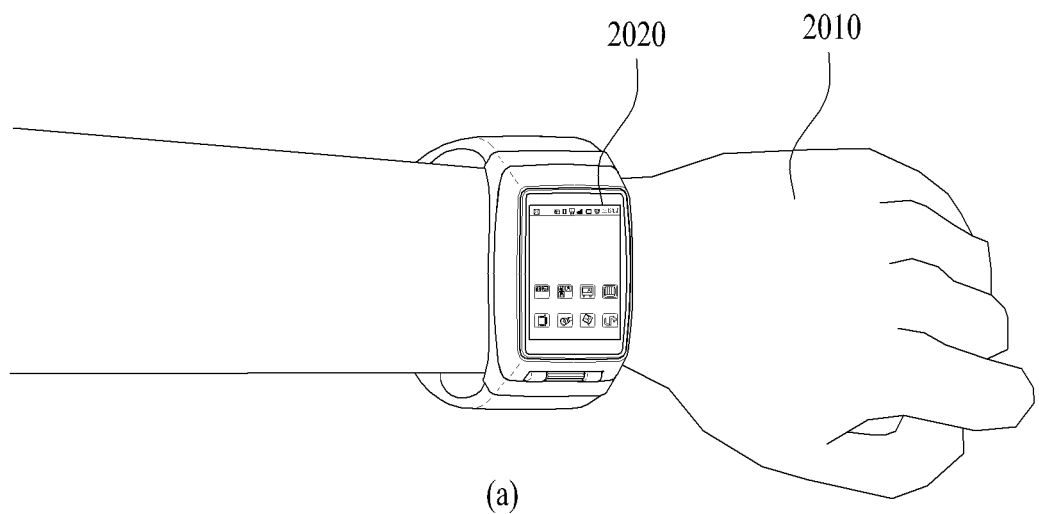
(a)
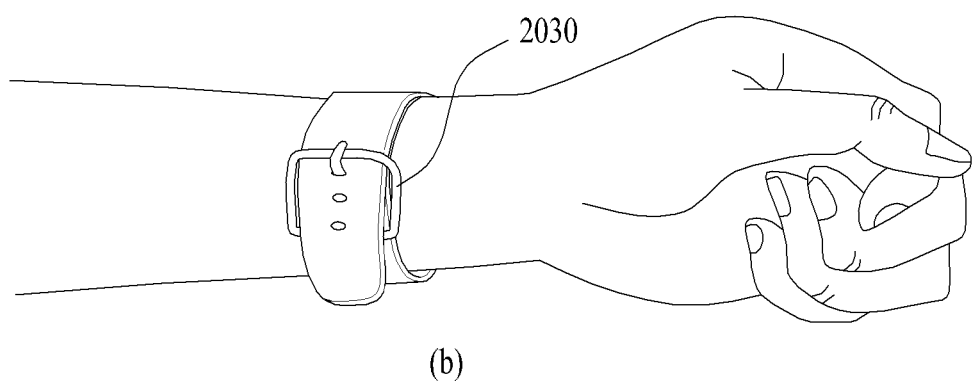
(b)

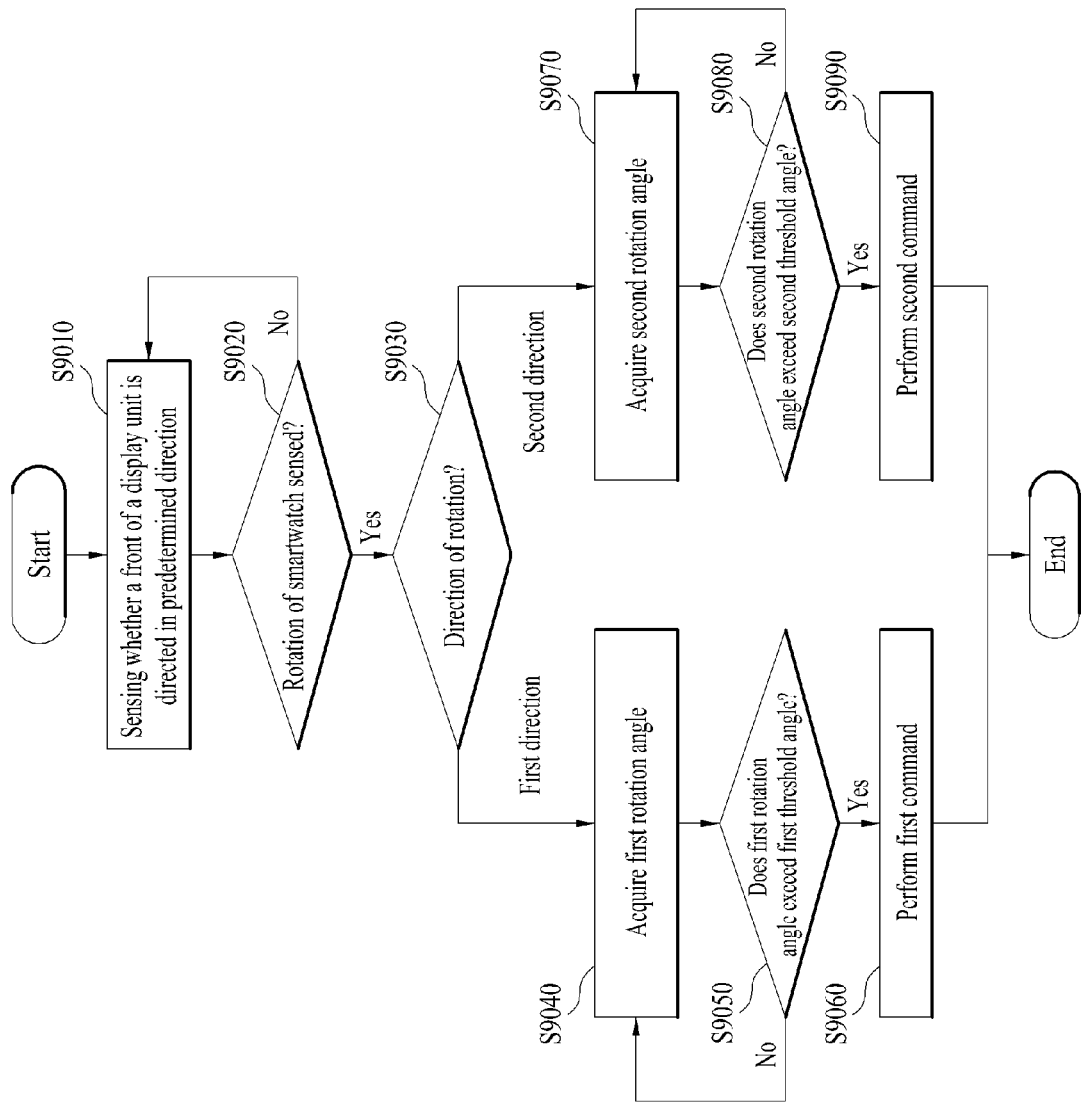

SMARTWATCH AND CONTROL METHOD THEREOF

This application claims the benefit of Korean Patent Application No. 10-2013-0105027, filed on Sep. 2, 2013, which is hereby incorporated by reference as if fully set forth herein.

BACKGROUND OF THE INVENTION

1. Field of the Invention

The disclosure relates to a smartwatch and a control method thereof, and more particularly, to a device for performing various commands according to direction of rotation and rotation angle of a smartwatch.

2. Discussion of the Related Art

With advances in technology, development of wearable computers has accelerated. Wearable computers refer to computers that a user can naturally wear like clothes, wristwatches, glasses, or accessories. Although smartphones and tablet PCs can be conveniently used using user fingers or a touch pen, they may be inconvenient in that the user has to stow the same in a pocket or bag or carry such devices. On the contrary, the user can wear a wearable computer on the wrist or on the eyes like glasses, thereby providing convenience in portability relative to the smartphone or tablet PC. In particular, among wearable computers, a variety of wristwatch related products, for example, a smartwatch, capable of wirelessly providing various services such as weather forecasts, messages, notifications, stock quotes, etc., have emerged.

A smartwatch can detect various movements of the arm of a user because the user wears the same on the wrist. In this case, various commands may be applied to the detected movements of the arm of the user so that the user may easily control the smartwatch. Especially, the smartwatch may be configured to perform a prescribed command according to a rotation gesture of the wrist of the user. At this time, if the same angle is designated as threshold angles in the inward and outward directions of rotation of the smartwatch, the smartwatch may operate contrary to user intention. This is because the inward and outward rotation radiuses of the wrist may differ according to the current position of the arm due to the physical characteristics of the human body. Accordingly, it is necessary to designate different threshold angles according to direction of rotation in order to prevent malfunction of the smartwatch.

SUMMARY OF THE INVENTION

Accordingly, the disclosure is directed to a smartwatch and a control method thereof that substantially obviates one or more problems due to limitations and disadvantages of the related art.

In accordance with an embodiment, the disclosure provides a smartwatch for performing corresponding commands according to direction of rotation and rotation angle of a device.

In accordance with another embodiment, the disclosure provides a smartwatch for differently offering a threshold angle needed to perform a command according to the position and direction of rotation of the smartwatch.

In accordance with still another embodiment, the disclosure provides a smartwatch for determining a command corresponding to rotation of the smartwatch according to an application which is being executed or displayed.

In accordance with another embodiment, the disclosure provides a smartwatch for performing a command corresponding to an event according to a sensed rotation of the smartwatch, when the rotation of the smartwatch is sensed within a predetermined period of time after the event is generated.

In accordance with still another embodiment, the disclosure provides a smartwatch for performing a command according to rotation of the smartwatch when the rotation speed of the smartwatch exceeds a predetermined speed.

In accordance with still another embodiment, the disclosure is to provide a method for controlling an external device paired with a smartwatch according to rotation of the smartwatch.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, the smartwatch includes a tilt sensor unit configured to sense a tilt of the smartwatch; a display unit configured to display an image; and a processor configured to control the tilt sensor unit and the display unit, wherein, when a front of the display unit is directed in a predetermined direction, the processor is further configured to: acquire, using the tilt sensor unit, a first rotation angle in a first direction when the smartwatch rotates in the first direction based on a rotation axis of the smartwatch and perform a first command corresponding to the first direction when the first rotation angle exceeds a first threshold angle, acquire, using the tilt sensor unit, a second rotation angle in a second direction when the smartwatch rotates in the second direction based on the rotation axis and perform a second command corresponding to the second direction when the second rotation angle exceeds a second threshold angle, and wherein the first direction is an opposite direction of the second direction and the first threshold angle is greater than the second threshold angle.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 2 and 3 are views illustrating a smartwatch worn by a user in accordance with an embodiment;

FIG. 9 is a flowchart illustrating a smartwatch control method in accordance with an embodiment.

DETAILED DESCRIPTION OF THE INVENTION

Although the terms used in the disclosure are selected from generally known and used terms while considering functions of the disclosure, definitions of the terms may vary according to intention or customs of those skilled in the art or to emergence of new technology. Some of the terms mentioned in the description of the disclosure may have been selected by the applicant at his or her discretion, and in such cases the detailed meanings thereof will be described in relevant parts of the description herein. Thus, the terms used in this disclosure should be interpreted based on the substantial meanings of the terms and the content of the disclosure rather than their simple names or meanings.

Embodiments will be described below in detail with reference to the attached drawings, which should not be construed as limiting the embodiments.

Figure 1:
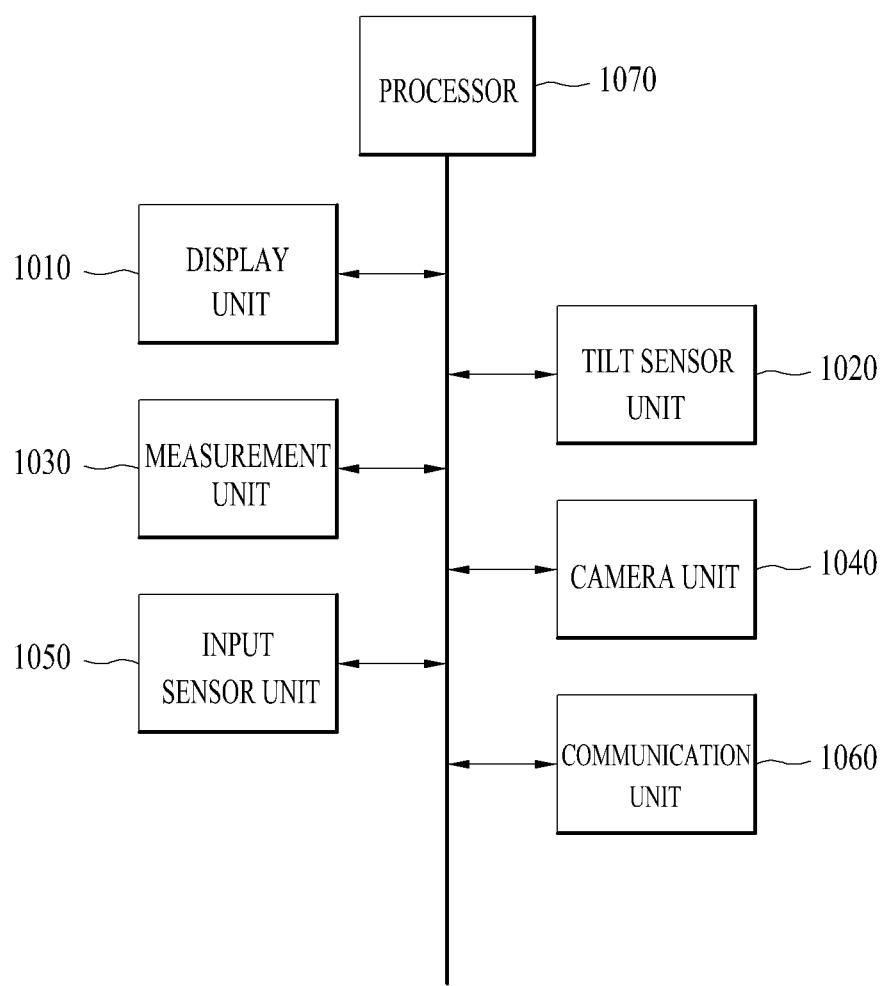
FIG. 1 is a block diagram of a smartwatch of the disclosure.

FIG. 1 is a block diagram of a smartwatch of the disclosure. In the disclosure, the smartwatch may include a display unit 1010, a tilt sensor unit 1020, a measurement unit 1030, a camera unit 1040, an input sensor unit 1050, a communication unit 1060, and a processor 1070.

The display unit 1010 may output visual information on a display screen. In addition, the display unit 1010 may output content executed in the processor 1070 or images based on a control command of the processor 1070. For example, the content may include videos, images, and text. In the disclosure, the display unit 1010 may display a notification for an event occurring in the smartwatch. Additionally, in the disclosure, the display unit 100 may display a directional indicator to indicate a direction of rotation of the smartwatch. This will be described later with reference to FIGS. 6 and 7.

The tilt sensor unit 1020 may sense tilt of the smartwatch. In more detail, the tilt sensor unit 1020 may sense a tilted direction and tilted level of the smartwatch using at least one sensor equipped in the smartwatch and provide the sensed result to the processor 1070. Alternatively, the tilt sensor unit 1020 may sense a direction of rotation and rotation degree of the smartwatch using at least one sensor equipped in the smartwatch and provide the sensed result to the processor 1070. In this case, the tilt sensor unit 1020 may include a plurality of sensing means. As an embodiment, the plurality of sensing means may include various sensing means such as a gravity sensor, a geomagnetic sensor, a gyro sensor, an acceleration sensor, an inclination sensor, an altitude sensor, a depth sensor, a pressure sensor, a gyroscope sensor, a proximity sensor, an angular rate sensor, a global positioning system (GPS) sensor, etc. In the disclosure, the tilt sensor unit 1020 may collectively refer to the various sensing means described above.

The measurement unit 1030 may measure the rotation speed of the smartwatch. In more detail, the measurement unit 1030 may measure the rotation speed of the smartwatch using at least one of sensors equipped in the smartwatch, upon sensing rotation of the smartwatch. Further, the measurement unit 1030 may provide the measured rotation speed to the processor 1070. In this case, the measurement unit may include a plurality of sensing means. As an embodiment, the plurality of sensing means may include various sensing means such as an acceleration sensor, an angular rate sensor, a rotation speed sensor, a stroboscope sensor, a magnetic pickup sensor, a tacho-generator sensor, etc. In the disclosure, the measurement unit 1030 may collectively refer to the various sensing means described above.

The camera unit 1040 may capture an image. More specifically, the camera unit 1040 may capture the image within an angle of view and transmit the captured result to the processor 1070. Especially, the camera unit 1040 may capture a user image within an angle of view and transmit the captured result to the processor 1070.

The input sensor unit 1050 may sense an input to the smartwatch. In more detail, the input sensor may sense input to the smartwatch and transmit the sensed result to the processor 1070. For example, the input sensor unit 10050 may sense touch input upon the rear of the smartwatch using at least one sensor and transmit the sensed result to the processor 1070. As another example, the input sensor unit 1050 may sense predetermined input to a buckle equipped in the smartwatch using at least one sensor and transmit the sensed result to the processor 1070. In this case, the input sensor unit 1050 may include a plurality of sensing means. As an embodiment, the plurality of sensing means may include various sensing means such as a proximity sensor, an infrared sensor, a temperature sensor, a touch sensor, a motion sensor, and a camera sensor. The processor 1070 may determine a mode of the smartwatch based on the sensed result transmitted by the input sensor unit 1050. A detailed description of the mode of the smartwatch will be described later with reference to FIG. 2.

The communication unit 1060 may communicate with an external device using various protocols and thus transmit/receive data to/from the external device. The communication unit 1060 may be connected to a network wirelessly or by wire and transmit/receive digital data such as content and images. In the disclosure, the smartwatch may perform pairing with the external device using the communication unit 1060. In addition, the smartwatch may perform communication access with the external device using the communication unit 1060. The paired external device may be controlled through the smartwatch and this will be described later in detail with reference to FIG. 6.

The processor 1070 may execute various applications by processing data stored in a device. The processor 1070 may perform a predetermined command according to input to the smartwatch, in more detail, according to rotation of the smartwatch. The processor 1070 may control the above-described units of the smartwatch and control data transmission and reception between units.

The processor 1070 may acquire the direction of rotation and a rotation angle of the smartwatch using the tilt sensor unit 1020 and perform a predetermined command according to the acquired direction of rotation and rotation angle. In this case, the processor 1070 may differently designate threshold angles at which a command can be performed according to the acquired direction of rotation. For example, upon sensing rotation in an outward direction of the smartwatch based on a rotation axis, the processor 1070 may perform a first command when a rotation angle exceeds a first threshold angle. Conversely, upon sensing rotation in an inward direction of the smartwatch based on a rotation axis, the processor 1070 may perform a second command when a rotation angle exceeds a second threshold angle. In this case, according to an embodiment, the first threshold angle may be greater than the second threshold angle. That is, malfunction of the smartwatch can be prevented by differently designating threshold angels according to direction of rotation in consideration of physical characteristics of a user. This will be described in detail with reference to FIG. 4.

In addition, the processor 1070 may detect a worn mode or an unworn mode. As an embodiment, the processor 1070 may determine the mode of the smartwatch to be the unworn mode upon not detecting user input upon the back of the smartwatch. Alternatively, upon detecting user input upon the back of the smartwatch, the processor 1070 may determine the mode of the smartwatch to be the worn mode. As another embodiment, the processor 1070 may determine the mode of the smartwatch to be the unworn mode when predetermined input to buckle of the smartwatch is not detected. Alternatively, the processor 1070 may determine the mode of the smartwatch to be the worn mode when predetermined input to the buckle of the smartwatch is detected. In this case, the predetermined input upon the buckle of the smartwatch may indicate a state in which the buckle is locked. That is, the mode of the smartwatch may be determined based on whether the buckle of the smartwatch is locked.

In this way, the processor 1070 may determine the mode of the smartwatch using the input sensor unit 1050. Furthermore, the processor 1070 may perform a prescribed command based on the determined mode of the smartwatch. This will be described later with reference to FIG. 2.

The processor 1070 may also detect an user image using the camera unit 1040. As an embodiment, the processor 1070 may detect the face of the user located within an angle of view using the camera unit 1040. As another embodiment, the processor 1070 may detect user gaze located within the angle of view using the camera unit 1040. Upon detecting the face and/or gaze of the user, the processor 1070 may perform a prescribed command according to rotation of the smartwatch. This will be described later in detail with reference to FIG. 3.

Meanwhile, although not shown in FIG. 1, the smartwatch of the disclosure may selectively include a power unit and an audio input/output unit.

The power unit (not shown) may be a battery in the interior of the smartwatch or a power source connectable to an external power source and may supply power to the smartwatch.

The audio input/output unit (not shown) may include audio output means such as a speaker and an earphone. The audio input/output unit may output content executed in the processor 1070 and voice based on a control instruction of the processor 1070. In particular, in the disclosure, the audio input/output unit may provide a voice notification for an event when the event occurs in the smartwatch. In addition, in the disclosure, the audio output unit may provide a directional indicator through voice to indicate a rotation gesture direction for controlling the smartwatch.

Hereinafter, if each step or operation performed in the smartwatch is started or processed by sensing of input to the smartwatch, a process of generating and receiving a signal according to the sensed input is interpreted as including description of the above process even though repeated description thereof is omitted. In addition, this can be expressed such that the processor 1070 controls the smartwatch or at least one unit included in the smartwatch. Description may be given by identically treating the processor 1070 as the smartwatch.

Meanwhile, the smartwatch illustrated in FIG. 1 is shown in block form according to an embodiment. Separate blocks are indicated by logically distinguishing elements of the smartwatch. Therefore, the above-described elements of the smartwatch may be incorporated into one or plural chips according to design of the smartwatch.

FIG. 2 is a view illustrating a smartwatch worn by a user according to an embodiment.

The smartwatch may include a smartwatch body and a strap so as to be worn on an arm 2010 of the user as illustrated in FIG. 2. If a plurality of straps is provided, the smartwatch may further include a connector (or buckle) 2030 for connecting the plural straps to one another. The smartwatch illustrated in FIG. 2 is purely an embodiment and a form thereof may be freely changed so long as the smartwatch is wearable on the wrist of the user.

The smartwatch has high portability and high accessibility due to small size thereof and wearing on the wrist of the user. Especially, since the smartwatch is worn on the arm which is a portion of the body most frequently and freely used by the user, the smartwatch can be easily controlled in correspondence to a prescribed command according to the movement of the arm of the user. Accordingly, the disclosure provides a control method capable of easily and conveniently controlling the smartwatch through a prescribed command corresponding to a rotation gesture of the wrist of the user.

In this case, a threshold angle for performing a command according to the position and direction of rotation of the smartwatch may be provided. Here, the threshold angle may differ according to direction of rotation of the smartwatch because the rotation radius of the smartwatch varies with the position and direction of rotation of the smartwatch.

More specifically, as shown in FIG. 2, if the user wears the smartwatch such that a display unit 2020 is positioned on the same surface as the back 2012 of the user's hand, the user may frequently perform a gesture of raising the arm so that the back 2010 of the hand wearing the smartwatch comes into sight of the user. In other words, the user may frequently perform a gesture such that the back 2010 of the user's hand is substantially parallel with the surface of the ground. This is because the user positions the wrist such that the display unit 202 is within the sight of the user in order to confirm content, images, etc. displayed on the display unit 2020. In this case, if the user rotates the wrist centering upon the rotation axis of the wrist, the rotation angle in the outward direction of the wrist may be large but the rotation angle in the inward direction of the wrist may be small. In other words, if the user maximally rotates the wrist in the outward or inward direction centering upon the rotation axis in the above-described position state of the arm, the rotation angle of the outward direction may be greater than the rotation angle of the inward direction. This is because the arm can be rotated within a predetermined angle range according to the structural characteristics of the arm.

Considering the above description, if the same threshold angle for performing a command is provided irrespective of the position and direction of rotation of the smartwatch in spite of the difference in rotation angle, the smartwatch may operate incorrectly. For example, if 50° is designated as a threshold angle for performing a command for rotation in the outward and inward directions, the user may easily execute the command for rotation in the outward direction but may be unable to execute or have difficulty in executing the command for rotation in the inward direction. This is because there are limitations in terms of rotation in the inward direction in the above-described position state of the wrist. Accordingly, the threshold angle for performing the command for rotation in the inward direction may be less than the threshold angle for performing the command for rotation in the outward direction.

That is, because the rotation in the outward direction is freer than the rotation in the inward direction and the rotation radius in the outward direction is greater than the rotation radius in the inward direction, the threshold angle in the outward direction may be designated to be greater than the threshold angle in the inward direction. In other words, because rotation in the inward direction is restricted compared with the rotation in the outward direction and the rotation radius in the inward direction is less than the rotation radius in the outward direction, the threshold angle in the inward direction may be designated to be smaller than the threshold angle in the outward direction. Through this, an error, which may be generated during execution of a command according to rotation of the smartwatch, can be prevented.

In this way, since the smartwatch of the disclosure performs a command according to direction of rotation and a rotation angle in a predetermined position state of the wrist, the current position state of the wrist needs to be detected. The position state of the wrist may be detected by detecting the position state of the smartwatch worn on the wrist. The position state of the smartwatch may be detected by detecting an user image using a camera unit or a tilt state of the smartwatch using a tilt sensor unit.

More specifically, in the case in which an user image is detected, the position of the smartwatch may be detected by detecting at least one of the face or gaze of the user through the camera unit. Alternatively, in the case in which the tilt state of the smartwatch is detected, the position of the smartwatch may be detected by acquiring the current tilt of the smartwatch through the tilt sensor unit. A detailed description of a position detection method of the smartwatch will be described later with reference to FIG. 3.

Meanwhile, a command according to rotation of the smartwatch is executed when a rotation gesture is made in the state that the user wears the smartwatch on the wrist. Hence, according to an embodiment, the smartwatch may first detect whether the smartwatch is worn on the wrist of the user prior to the aforementioned position detection of the smartwatch. In more detail, the smartwatch may detect a smartwatch worn mode or unworn mode as a smartwatch mode through the input sensor unit described in relation to FIG. 1. If predetermined input is sensed through the input sensor unit, the smartwatch may detect a current mode thereof as a worn mode and then may detect the position thereof. Conversely, if predetermined input is not sensed through the input sensor unit, the smartwatch may detect a current mode thereof as a unworn mode and may then no longer detect the position thereof. That is, in the worn mode, the smartwatch may perform a prescribed command according to the position, direction of rotation, and rotation angle thereof.

Thus, the smartwatch of the disclosure may be controlled according to the position, direction of rotation, and rotation angle thereof. Especially, if the smartwatch is in a predetermined position, a prescribed command may be performed according to direction of rotation and rotation angle. In this case, the predetermined state of the smartwatch may indicate the case in which the front of the display unit 2020 is directed in a predetermined direction and a detailed description thereof will be described later with reference to FIG. 3.

Meanwhile, for convenience of description, the outward direction may be referred to as a first direction and the inward direction may be referred to as a second direction. In addition, a command corresponding to rotation in the first direction may be referred to as a first command and a command corresponding to rotation in the second direction may be referred to as a second command. Furthermore, a threshold angle for performing a command corresponding to the first direction may be referred to as a first threshold angle and a threshold angle for performing a command corresponding to the second direction may be referred to as a second threshold angle.

Figure 3:
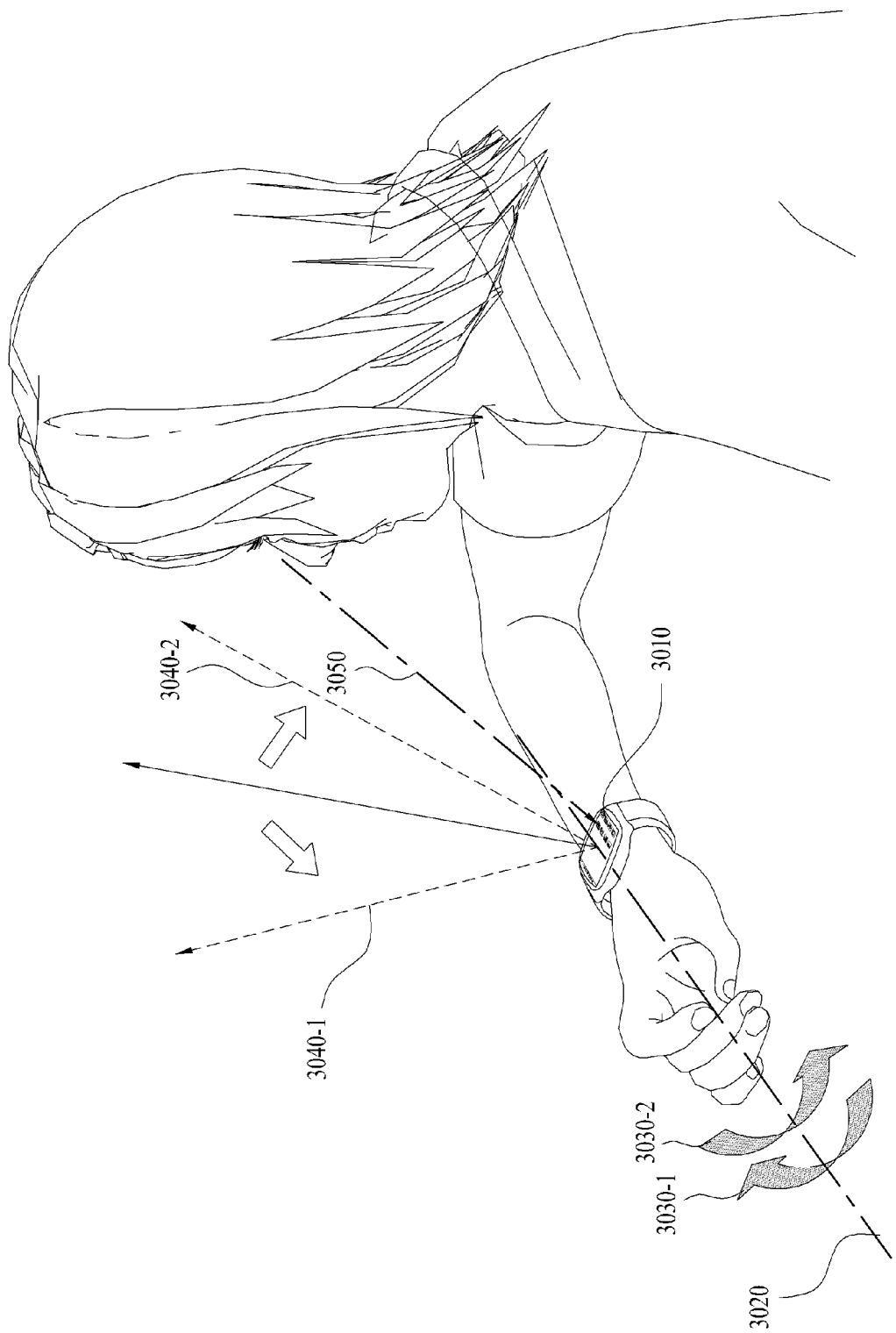

FIG. 3 is a view illustrating a smartwatch worn state by a user according to an embodiment. More specifically, FIG. 3 is a view explaining the above-described predetermined position of the smartwatch described in association with FIG. 2.

As described earlier, if the user wears the smartwatch such that a display unit 3010 is positioned on the same side as the back of the hand, the user may frequently perform a gesture causing the back of the hand upon which the smartwatch is worn to come into sight 3050 of the user. The smartwatch of the disclosure may perform a prescribed command according to direction of rotation 3030-1 or 3030-2 and a rotation angle, based on such a position of the smartwatch. Accordingly, in the disclosure, the above position of the smartwatch is referred to as a reference position and details of the reference position will be described hereinbelow.

As an embodiment, the reference position of the smartwatch may indicate a state that the front of the display unit 3010 included in the smartwatch is directed in a predetermined direction. More specifically, the reference position of the smartwatch may indicate a state that the front of the display unit 3010 faces an upper side. In more detail, as illustrated in FIG. 3, the reference position of the smartwatch may indicate a state that the user positions the back of the hand in the direction of an upper side in order to watch the smartwatch. Notably, the upper side means a substantially upper side. Therefore, an error within a prescribed range may be permitted. For example, the state that the front of the display unit 3010 faces the upper side may include the case in which an angle between a normal line 3040-1 or 3040-2 of the front of the display unit 3010 and the ground surface is about 70 to 110 degrees. The smartwatch may detect the reference position of the present embodiment by acquiring the tilt thereof using the tilt sensor unit described in relation to FIG. 1.

In addition, the reference position of the smartwatch may be a state that the front of the display unit 3010 faces a lower side. For example, if the user looks at the smartwatch while lying on the back, the reference position of the smartwatch may be a state that the front of the display unit 3010 faces the lower side rather than the upper side. In this case, the smartwatch may detect, using the tilt sensor unit, whether the user is lying down. If the smartwatch detects that the user is lying down, the smartwatch may determine that a position at which the front of the display unit 3010 faces the lower side is the reference position. Notably, the lower side means a substantially lower side and an error within a prescribed range may be permitted.

Meanwhile, the display unit 3010 may indicate a display area positioned on the back of the hand of the user. For instance, in case of a smartwatch comprised of one flexible display panel, a display area positioned on the back of the hand of the user out of the region of a flexible display may be referred to as the display unit 3010.

As another embodiment, if a user image is detected through the camera unit, the reference position of the smartwatch may indicate the position of the smartwatch at a detected time. That is, if the user image is detected through the camera unit, the position of the smartwatch at a detected time may be the reference position. Accordingly, if rotation of the smartwatch is sensed after the user image is detected, the smartwatch may perform a prescribed command according to direction of rotation 3030-1 or 3030-2 and the rotation angle thereof.

Hence, the reference position in the present embodiment is not necessarily a position at which the front of the display unit faces the upper side, unlike the above embodiment. For example, if the user image indicating that the user is viewing the display unit while lying down is detected, the smartwatch may perform a prescribed command corresponding to rotation by judging the current position to be the reference position even though the front of the display unit does not face an upper side. Meanwhile, the user image in the disclosure may include the face and gaze of the user as described in association with FIG. 1.

The above-described embodiments may be separately implemented or may be implemented through combinations thereof, as a method for detecting the reference position of the smartwatch. Further, the detection method may be freely changed within an allowable range by the persons skilled in the art according to configuration and design of a device or setup by a user.

If the current position of the smartwatch is determined to be the reference position, the smartwatch may obtain the direction of rotation and rotation angle thereof. More specifically, if the rotation of the smartwatch is sensed based on a rotation axis 3020 of the smartwatch, the direction of rotation 3030-1 or 3030-2 and the rotation angle may be obtained. Here, the rotation axis of the smartwatch may include a centerline passing through the wrist or an outer boundary line 3020 of the back of the hand, as an embodiment. For convenience, a description will be given hereinafter based on a smartwatch rotating about the outer boundary line 3020 of the back of the hand as a rotation axis. In addition, the rotation of the smartwatch may indicate rotation in the state of the reference position of the smartwatch even if a repeated description is omitted.

Next, the smartwatch may perform a prescribed command according to the obtained direction of rotation 3030-1 or 3030-2 and the rotation angle and this will be described later in detail with reference to FIG. 4.

Figure 4:
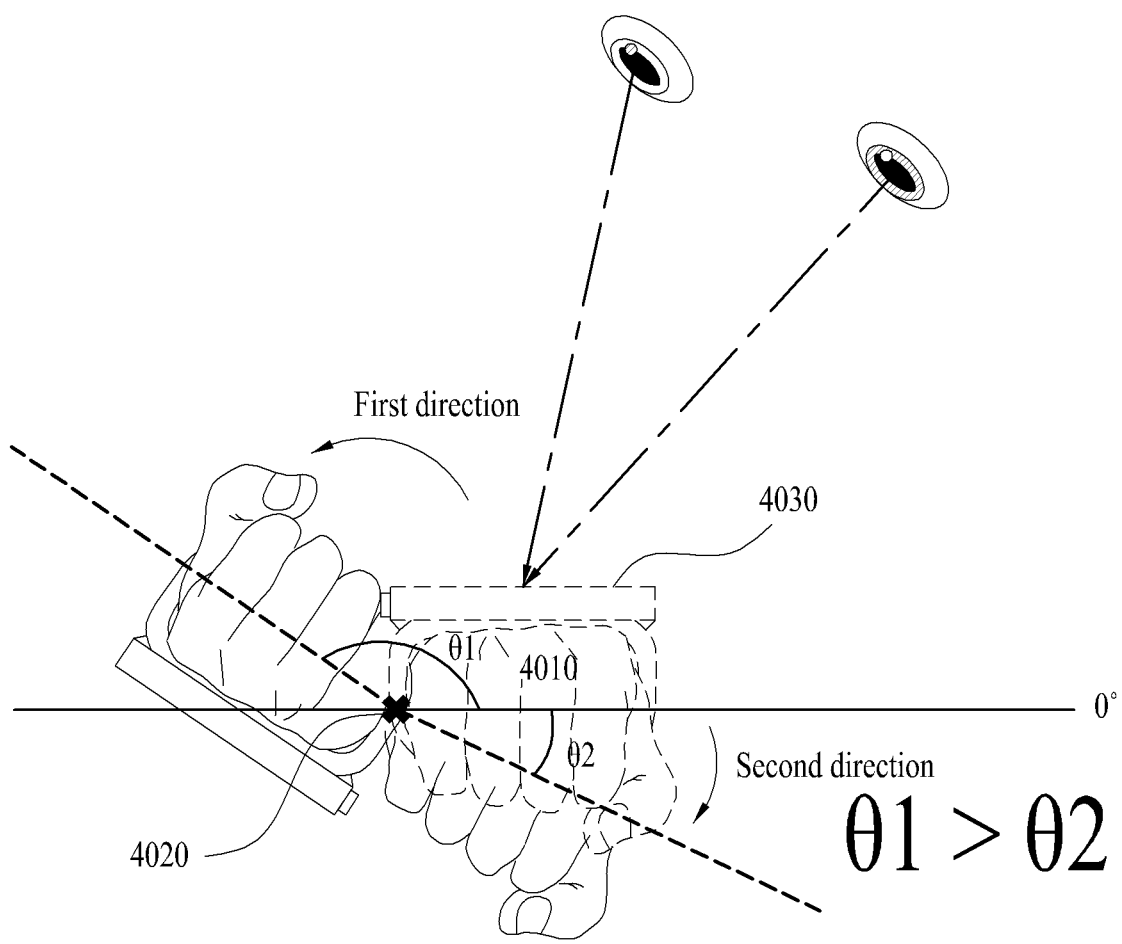
FIGS. 4 and 5 are views illustrating a smartwatch rotating based on a rotation axis in accordance with an embodiment.

FIG. 4 is a view illustrating a smartwatch rotating based on a rotation axis according to an embodiment. More specifically, FIG. 4 illustrates a scene when viewing the rotation of the wrist of a user wearing a smartwatch 4030 from the front.

The smartwatch 4030 may rotate in a first or second direction based on a rotation axis 4020. In more detail, the smartwatch 4030 may rotate in the first or second direction according to a wrist rotation gesture of the user in the reference position 4010.

If rotation in the first direction in the reference position 4010 of the smartwatch 4030 is sensed, the smartwatch 4030 may acquire a first rotation angle which is a rotation angle in the first direction. As an embodiment, the smartwatch 4030 may acquire the rotation angle by sensing a tilt degree using the tilt sensor unit. As another embodiment, the smartwatch 4030 may acquire the rotation angle through prescribed calculation by obtaining a rotation speed using the tilt sensor unit.

If the acquired first rotation angle exceeds a first threshold angle θ1, the smartwatch 4030 may perform a first command corresponding to the first direction. Likewise, if rotation in the second direction in the reference position 4010 of the smartwatch 4030 is sensed, the smartwatch 4030 may acquire a second rotation angle which is a rotation angle in the second direction. The second rotation angle may be obtained using the tilt sensor unit as described previously. If the acquired second rotation angle exceeds a second threshold angle θ2, the smartwatch 4030 may perform a second command corresponding to the second direction. In this case, the first threshold angle θ1 may be greater than the second threshold angle θ2.

The reason why the first threshold angle θ1 is greater than the second threshold angle θ2 is that a rotation radius in the first direction is greater than a rotation radius in the second direction, in the reference position 4010 of the smartwatch 4030, due to physical characteristics of a user as described above with reference to FIG. 2. As described above, malfunction of the smartwatch 4030 can be prevented by differently designating the threshold angles θ1 and θ2 according to rotation of direction.

Meanwhile, the first threshold angle θ1 and the second threshold angle θ2 may be determined according to configuration and design of the smartwatch 4030, a currently executed application type, setup by a user, or physical characteristics of a user. Further, the first threshold angle θ1 and the second threshold angle θ2 may be determined not only as absolute angles but also as relative angles. This will be described later in detail with reference to FIG. 5.

Figure 5:
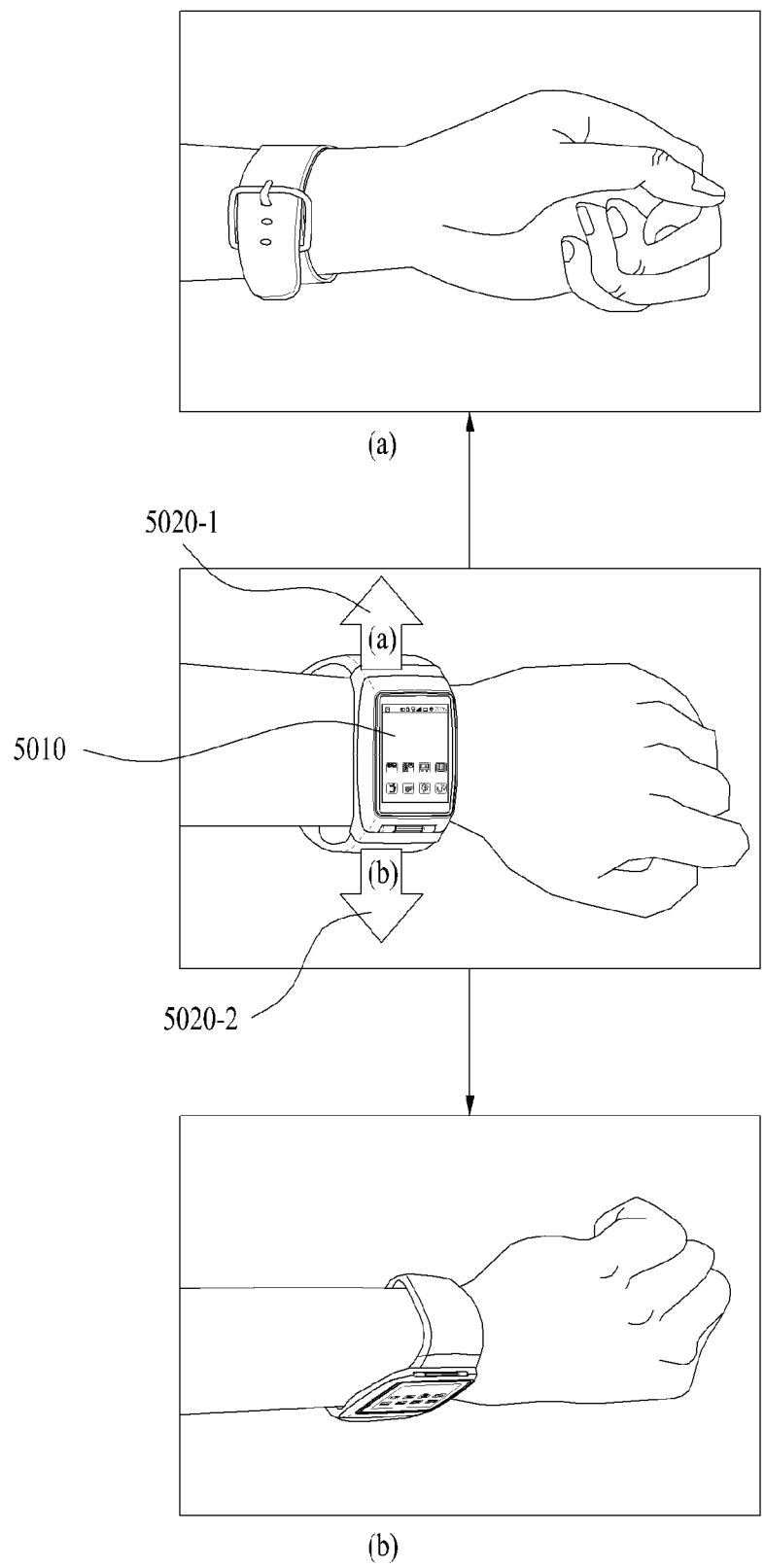

FIG. 5 is a view illustrating a smartwatch rotating based on a rotation axis according to an embodiment. More specifically, FIG. 5 illustrates a scene when viewing the rotation of the wrist of a user wearing the smartwatch from the top.

The smartwatch may be positioned such that a front 5010 of a display unit faces an upper side. Alternatively, the smartwatch may be positioned such that the front 5010 of the display unit is exposed to user gaze. In this case, the position of the smartwatch may be referred to as the reference position as described previously in association with FIG. 4.

Next, the smartwatch may rotate according to movement of the wrist of the user. In more detail, the smartwatch may rotate in the direction of an outward side 5020-1 in the reference position as illustrated in FIG. 5(a). Alternatively, the smartwatch may rotate in the direction of an upper side 5020-1 of the display unit from the reference position as illustrated in FIG. 5(a). Conversely, the smartwatch may rotate in the direction of an inward side 5020-2 from the reference position as illustrated in FIG. 5(b). Alternatively, the smartwatch may rotate in the direction of a lower side 5020-2 of the display unit in the reference position as illustrated in FIG. 5(b).

In this case, if the degree of rotation of the smartwatch exceeds a predetermined threshold value, the smartwatch may perform a command according to direction of rotation. Here, the first direction 5020-1 corresponds to the first threshold angle and the second direction 5020-2 corresponds to the second threshold angle, as described above.

The first threshold angle and the second threshold angle may be fixed as absolute angle values according to design of the smartwatch. For example, the first threshold angle may be fixed to 30° and the second threshold angle may be fixed to 10°. That is, if the smartwatch senses rotation thereof by 30° or more in the first direction 5020-1 from the reference position, the smartwatch may perform a first command corresponding to the first direction 5020-1. Alternatively, if the smartwatch senses rotation thereof by 10° or more in the second direction 5020-2 from the reference position, the smartwatch may perform a second command corresponding to the second direction 5020-2.

Alternatively, the first threshold angle and the second threshold angle may be set to relative values. More specifically, if a threshold angle value of any one direction is determined, a threshold angle value of the other direction may be determined as a relative value to the determined angle value. For example, the smartwatch may designate the difference between the first threshold angle and the second threshold angle as 20°. Therefore, if the first threshold angle is determined to be 30°, the smartwatch may determine the second threshold angle to be 10° through calculation. Conversely, if the second threshold angle is determined to be 10°, the smartwatch may determine the first threshold angle to be 30° through calculation.

As another embodiment, the smartwatch may designate the ratio of the first threshold angle to the second threshold angle as 2:1. Therefore, if the first threshold angle is determined to be 30°, the smartwatch may determine the second threshold angle to be 15° through calculation. Alternatively, if the second threshold angle is determined to be 15°, the smartwatch may determine the first threshold angle to be 30° through calculation.

Namely, if a threshold angle value of any one direction is determined, a threshold angle value of the other direction corresponding to the determined threshold value may be designated. In addition, a threshold angle value may be determined according to configuration and design of the smartwatch, currently executed application, and/or setup by a user and is not restricted to the above-described embodiments.

Figure 6:
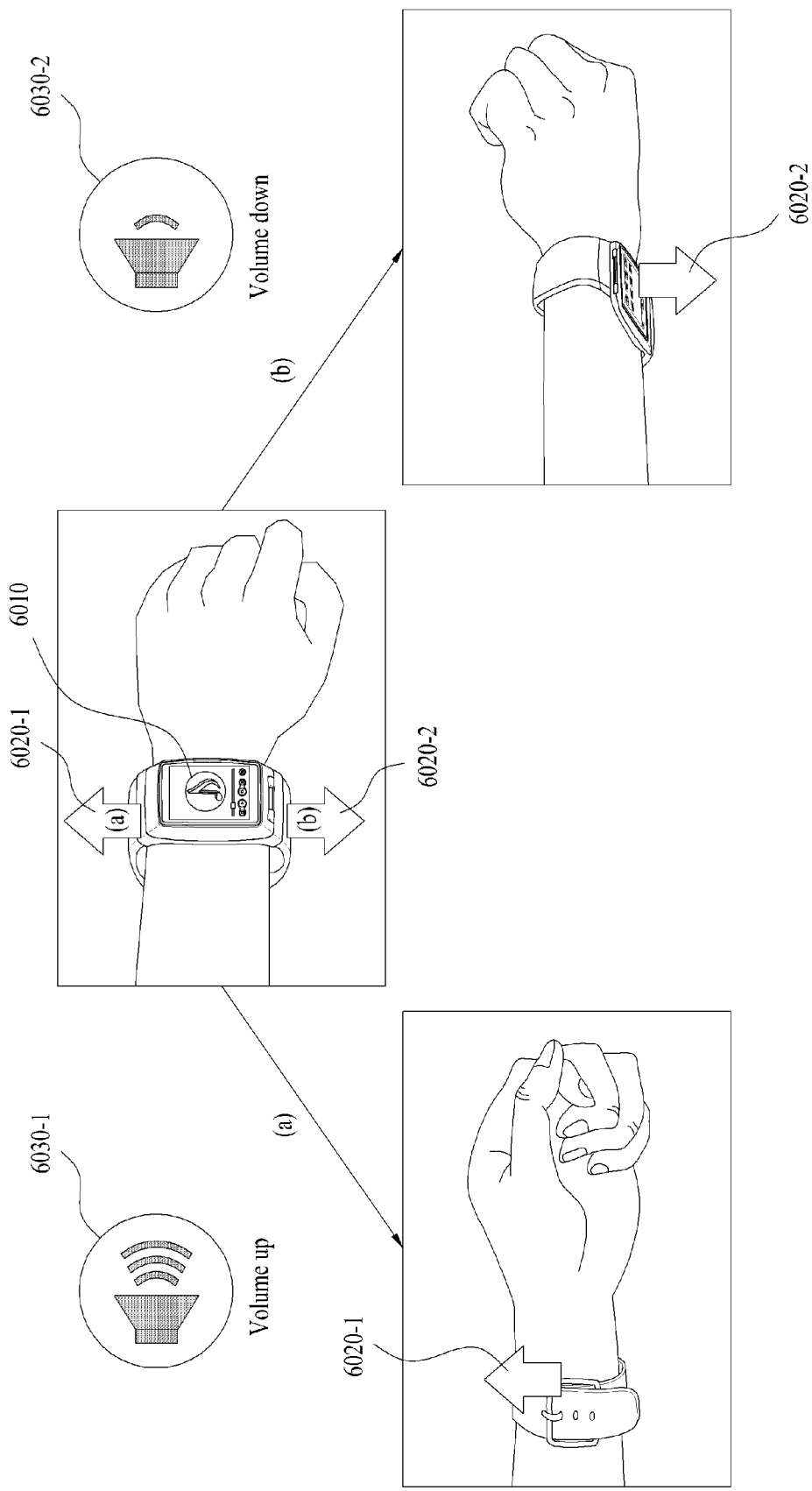
FIG. 6 is a view illustrating a smartwatch performing a command according to rotation of the smartwatch in accordance with an embodiment.

FIG. 6 is a view illustrating a smartwatch performing a command according to a rotation of the smartwatch in accordance with an embodiment.

As an embodiment, the smartwatch may determine a type of a command performed according to a currently executed application type. In more detail, the smartwatch may determine a type of a command corresponding to the rotation thereof according to a currently executed application. Alternatively, the smartwatch may determine a type of a command performed according to a currently displayed application execution screen. More specifically, the smartwatch may determine a type of a command corresponding to a rotation of the smartwatch according to a currently displayed application execution screen.

For example, if a music playback application 6010 is being executed, the smartwatch may perform a volume control command 6030-1 or 6030-2 according to rotation of the smartwatch. In more detail, if the smartwatch rotates based on a rotation axis in an outward direction while the music playback application 6010 is being executed, the smartwatch may perform the volume-up command 6030-1. Alternatively, if the smartwatch rotates based on the rotation axis in an inward direction while the music playback application 6010 is being executed, the smartwatch may perform the volume-down command 6030-2. In this way, the smartwatch determines a type of a command according to a type of the currently executed application 6010, thereby providing an easier and convenient smartwatch control method to a user.

In addition, the smartwatch may perform various commands such as audio/video playback control, image magnification/reduction control, execution control command, scroll control, etc. Types of commands are not limited to the commands of the above embodiment and may include various other control commands.

Commands performed according to the directions of rotation 6020-1 and 6020-2 of the smartwatch may be commands corresponding to each other. In other words, a first command and a second command may be commands corresponding to each other. For example, if the first command is the volume-up command 6030-1, the second command may be the volume-down command 6030-2. If the first command is a scroll-up command, the second command may be a scroll-down command. Thus, the smartwatch of the disclosure allows two commands performed according to the directions of rotation 6020-1 and 6020-2 to correspond to each other, thereby providing an easier and intuitive smartwatch control method.

Further, as an additional embodiment, the smartwatch may offer a directional indicator indicating a direction of rotation for performing a command, a detailed description of which will be given with reference to FIG. 7.

Meanwhile, although not shown, the smartwatch may control an external device paired therewith according to rotation thereof. For instance, if the smartwatch is paired with a smartphone through a communication unit, the smartwatch may control the smartphone according to rotation thereof. In more detail, if the music playback application 6010 is being executed in the smartphone, a user may perform the volume control command 6030-1 or 6030-2 for the smartphone through rotation of the smartwatch.

This facilitates ease of control of the external device by controlling the external device through the smartwatch having ease of access and portability in the case in which a user uses the smartwatch paired with a plurality of devices. Hence; according to the present embodiment, the user can indirectly control the external device using rotation of the smartwatch paired with the external device, without direct control of the external device.

Figure 7:
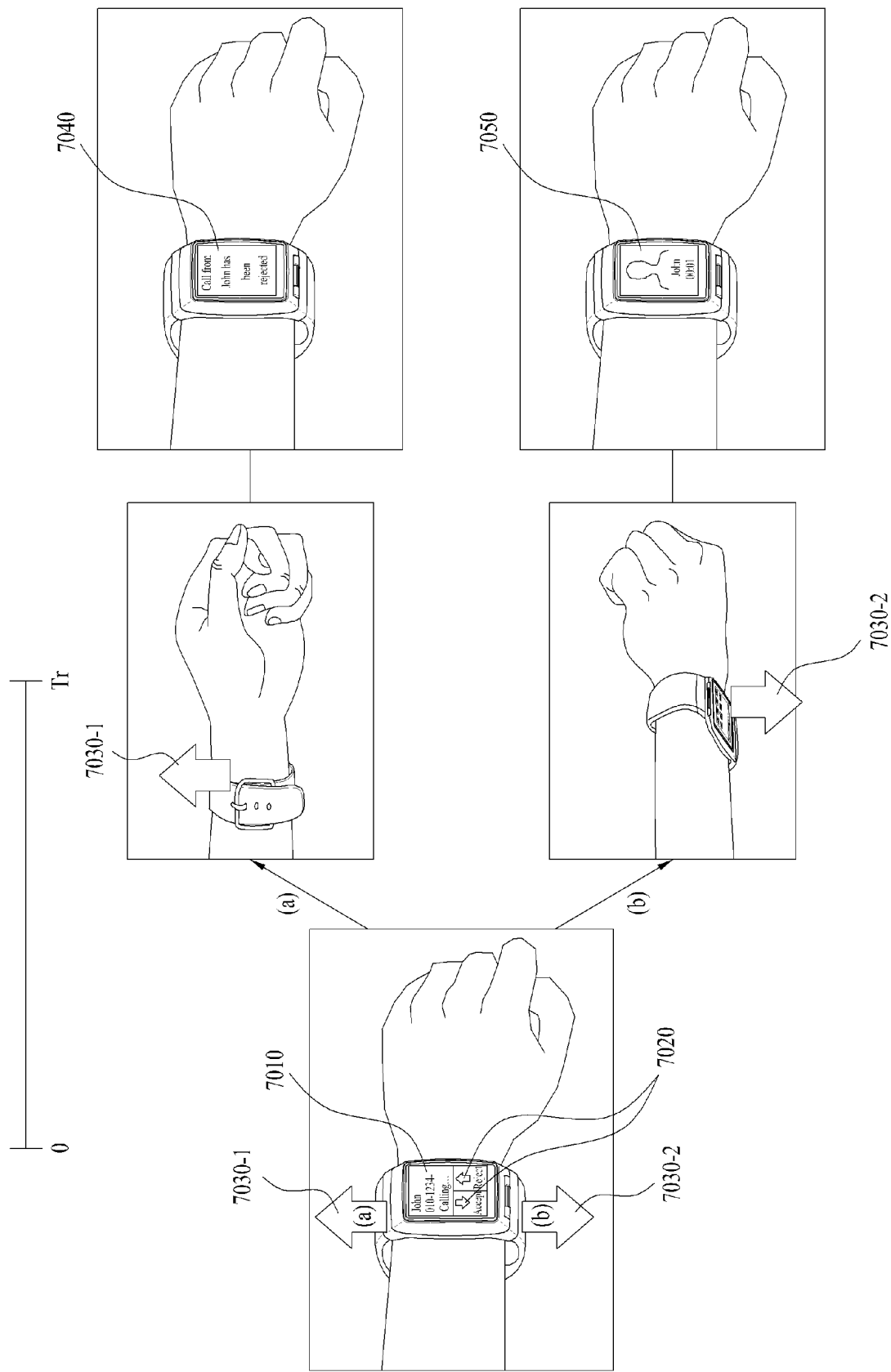
FIG. 7 is a view illustrating a smartwatch in which an event is generated in accordance with an embodiment.

FIG. 7 is a view illustrating a smartwatch in which an event is generated in accordance with an embodiment.

In the smartwatch of the disclosure, a predetermined event may be generated. In this case, the event may indicate a state variation occurring in the smartwatch. For example, the event may include an incoming telephone call, text message reception, new message reception through a social networking service (SNS), a scheduled alarm, an alert, an update alert, and weather alert. In this case, the smartwatch may provide a notification 7010 regarding the generated event. The notification 7010 may indicate an action informing a user that the aforementioned event has occurred. In the disclosure, the notification 7010 may include auditory, visual, and tactile notifications.

If the notification 7010 regarding the event is provided and rotation of the smartwatch is sensed within a predetermined period of time Tr, the smartwatch may perform a command corresponding to the event or notification.

For example, when an incoming telephone call event occurs, the smartwatch may provide the notification 7010 regarding the event. If rotation of the smartwatch is sensed within the predetermined period of time Tr after the notification 7010 is provided, the smartwatch may perform a prescribed command corresponding to the incoming telephone call event or incoming telephone call notification 7010 according to rotation of the smartwatch. In more detail, if the telephone call notification 7010 occurs and rotation of the smartwatch in a first direction 7030-1 is sensed within the predetermined period of time Tr, the smartwatch may reject the incoming telephone call (7040). Alternatively, if the telephone call notification 7010 occurs and rotation of the smartwatch in a second direction 7030-2 is sensed within the predetermined period of time Tr, the smartwatch may accept the incoming telephone call (7050).

As another example, if a text message reception event occurs, the smartwatch may offer a notification regarding the event. If rotation of the smartwatch is sensed within the predetermined period of time Tr after the notification is provided, the smartwatch may perform a command for confirming or disregarding the received text message.

If the notification 7010 occurs and rotation of the smartwatch is sensed after the predetermined period of time Tr, the smartwatch may not perform a command corresponding to the event or notification 7010. In this case, in some embodiments, the above embodiment in association with FIG. 6 in which, if rotation of the smartwatch is sensed, a command designated according to a currently executed application type may be implemented.

In the embodiment related to FIG. 7, the command according to rotation may refer to a command performing or rejecting a generated event as a command corresponding to the event generated in the smartwatch. Notably, a type of the command according to rotation is not restricted to the above-described embodiment and embodiments of various commands corresponding to the event or notification 7010 may be implemented.

In addition, the smartwatch may perform first a command corresponding to the event or notification 7010 prior to a command corresponding to an application which is being executed. For example, as described with reference to FIG. 6, if rotation of the smartwatch is sensed while the music playback application is being executed, the smartwatch may perform a volume control command according to rotation of the smartwatch. However, if a telephone call is received while the music playback application is being executed and if the notification 7010 for the received telephone call is provided, the smartwatch may perform an event control command prior to the volume control command.

Meanwhile, upon providing the notification 7010 for the event, the smartwatch may also provide a directional indicator 7020 for performing a command. In other words, the smartwatch may further offer the directional indicator 7020 for guiding direction of rotation corresponding to each command. For example, upon providing the notification 7010 indicating an incoming telephone call event, the smartwatch may further offer the indicator 7020 of a lower direction for performing a command accepting the received telephone call. Alternatively, the smartwatch may further offer the indicator 7020 of an upper direction for performing a command rejecting the received telephone call.

The directional indicator 7020 may include visual, auditory, and tactile indicators according to an embodiment and is not limited to the above-described embodiment. Further, the directional indicator 7020 is not limited to the case in which the notification 7010 is provided and may be provided to various cases in which direction of rotation for performing a command needs to be guided.

Figure 8:
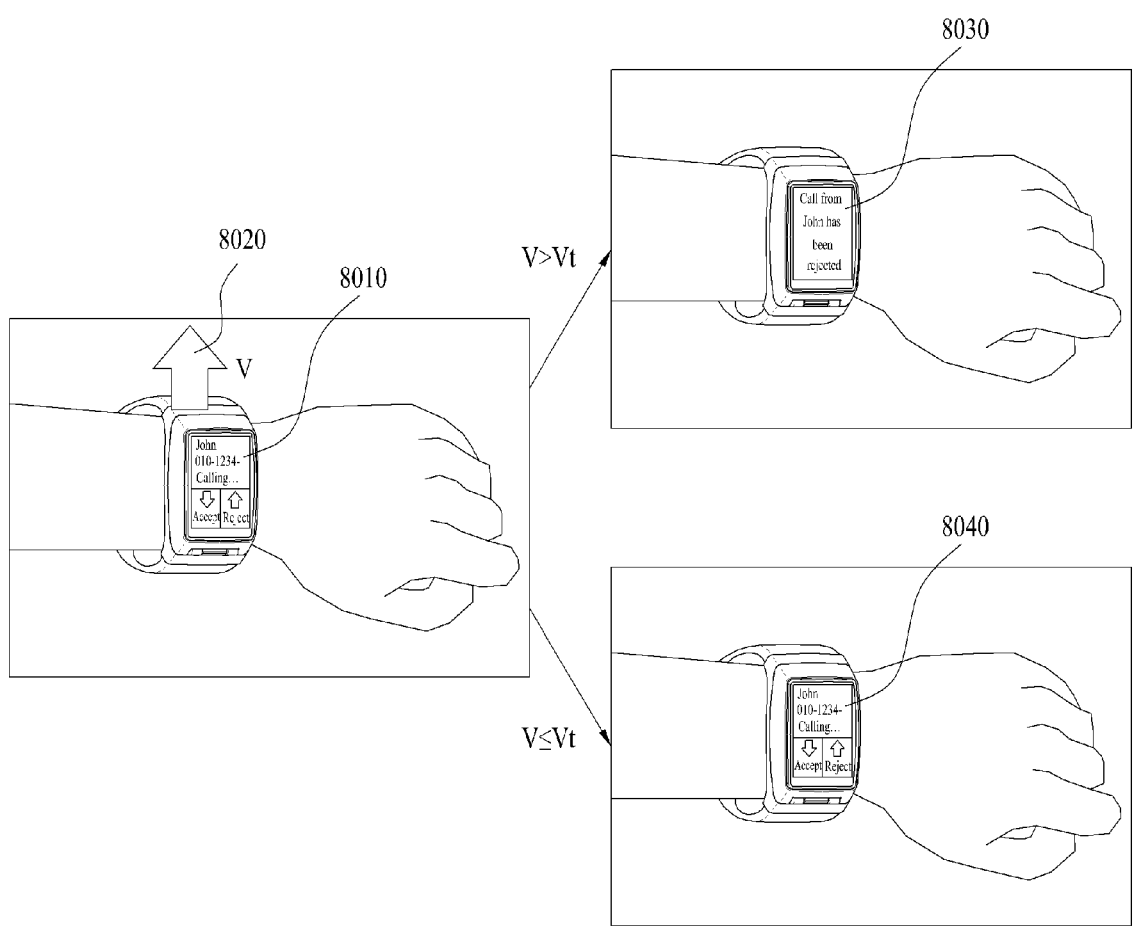
FIG. 8 is a view illustrating a smartwatch performing a command corresponding to a rotation speed in accordance with an embodiment.

FIG. 8 is a view illustrating a smartwatch performing a command corresponding to a rotation speed in accordance with an embodiment.

According to an embodiment, the smartwatch may acquire a rotation speed V thereof using a measurement unit. More specifically, the smartwatch may acquire the rotation speed V thereof using the measurement unit above-described with reference to FIG. 1. For example, the smartwatch may obtain the rotation speed V by measuring a tilt variation thereof during a predetermined period of time. Alternatively, the smartwatch may measure force applied during rotation thereof and acquire the rotation speed V through prescribed calculation from the measurement force. As another option, the smartwatch may measure time consumed until the smartwatch rotates after exceeding a threshold angle and acquire the rotation speed V through prescribed calculation from the measured time.

If the acquired rotation speed V of the smartwatch exceeds a threshold speed Vt, the smartwatch may perform a command according to a rotation of the smartwatch. However, if the acquired rotation speed V of the smartwatch is less than the threshold speed Vt, the smartwatch may not perform a command according to rotation of the smartwatch. For example, if the smartwatch rotates in a first direction 8020 at the rotation speed exceeding the threshold speed Vt while a telephone call incoming notification 8010 is being provided, the smartwatch may reject the received telephone call (8030). Conversely, if the smartwatch rotates in a first direction 8020 at the rotation speed less than the threshold speed Vt while the telephone call incoming notification 8010 is being provided, the smartwatch may not perform an additional operation (8040).

In the disclosure, the rotation speed V may indicate how much the smartwatch rotates during a predetermined period of time. If the measured rotation speed is less than the threshold speed Vt, this may indicate that the smartwatch has rotated by a predetermined angle or less during the predetermined period of time. Rotation at such a slow speed may be difficult to interpret as rotation for performing a command. Accordingly, in order to prevent unintentional operation of the smartwatch, the smartwatch may be designed such that the smartwatch may perform a command only when the rotation of the smartwatch exceeds the threshold speed Vt, by designating the threshold speed Vt.

Here, rotation at a very high speed is also difficult to interpret as rotation intended by a user to perform a command. This is because the rotation speed V may exceed the threshold value Vt even when a user does exercise such as running. In this case, an additional threshold speed Vt' different from the above-described threshold speedy Vt may be designated so that rotation of the smartwatch reflecting the intention of a user may be more accurately detected. For example, if the threshold speed exceeds a first threshold speed or is less than a second threshold speed, the smartwatch may perform a command according to rotation of the smartwatch, thereby preventing malfunction of the smartwatch. That is, in some embodiments, a plurality of threshold velocities may be designated as the threshold speed Vt to prevent malfunction of the smartwatch.

In addition, the threshold velocities Vt may be variously configured according to configuration, design, utility fields, application types, and users of the smartwatch and is not restricted to the above-described embodiment.

FIG. 9 is a flowchart illustrating a smartwatch control method according to an embodiment. In the flowchart, a detailed description of repetitive or similar parts to the above description given with respect to FIGS. 1 to 8 will be omitted.

First, the front of a display unit of the smartwatch may face a predetermined direction (S9010). In more detail, the smartwatch may detect whether the front of the display unit is in the predetermined direction. In this case, the predetermined direction may be an upper direction. Alternatively, the predetermined direction may indicate a direction in which the front of the display unit is directed when a user image is detected through a camera unit. The smartwatch may sense whether the front of the display unit is in the predetermined direction through a tilt sensor unit and the camera unit and a detailed description thereof is as described above with reference to FIGS. 3 and 4. In addition, the smartwatch may detect whether a mode is a smartwatch worn mode or a smartwatch unworn mode through the input sensor unit and a detailed description thereof is as described above with reference to FIG. 2.

Next, the smartwatch may sense whether the smartwatch rotates (S9020). More specifically, the smartwatch may sense whether the smartwatch rotates based on a rotation axis.

If rotation of the smartwatch is sensed, the smartwatch may further sense a direction of rotation (S9030). In the disclosure, the smartwatch may rotate in an outward direction or in an inward direction. The outward direction may be referred to as a first direction and the inward direction may be referred to a s second direction.

Meanwhile, if the rotation of the smartwatch is not sensed, the smartwatch may not perform an additional operation (S9010). Alternatively, if the rotation of the smartwatch is not sensed, the smartwatch may return to the previous step (S9010).

If the smartwatch senses that the smartwatch rotates in the first direction, the smartwatch may acquire a first rotation angle, which is a rotation angle in the first direction (S9040). Conversely, if the smartwatch senses that the smartwatch rotates in the second direction, the smartwatch may obtain a second rotation angle, which is a rotation angle in the second direction (S9070). The first rotation angle and the second rotation angle may be obtained using the tilt sensor unit and a detailed description thereof is as described above with reference to FIG. 1. As an additional embodiment, the smartwatch may measure a rotation speed in each direction of rotation using the measurement unit and a detailed description thereof is as described previously with reference to FIG. 8.

Next, the smartwatch may determine whether the first rotation angle or the second rotation angle, obtained in the previous step, exceeds a first threshold angle or a second threshold angle, respectively, (S9050 and S9080). In more detail, the smartwatch may determine whether the first rotation angle exceeds the first threshold angle (S9050). Alternatively, the smartwatch may determine whether the second rotation angle exceeds the second threshold angle (S9080).

If the first angle exceeds the first threshold angle, the smartwatch may perform a first command corresponding to the first direction (S9060). Alternatively, if the second rotation angle exceeds the second threshold angle, the smartwatch may perform a second command corresponding to the second direction (S9090). In this case, the first threshold angle may be greater than the second threshold angle. This is because a rotation radius in the first direction is greater than a rotation radius in the second direction, in the state that the display unit faces the predetermined direction and a detailed description thereof is as described above in association with FIG. 2. The first command corresponding to the first direction and the second command corresponding to the second direction may be commands corresponding to each other. The first command and the second command may be determined according to a currently executed application or a currently displayed application execution screen. A detailed description thereof is as described above in relation to FIG. 6. If an event occurs in the smartwatch and a notification regarding the event is provided, the smartwatch may perform a command corresponding to the notification according to rotation of the smartwatch. In more detail, if the rotation of the smartwatch is sensed within a predetermined period of time after the notification is provided, a command corresponding to the notification provided according to the sensed rotation may be performed. A detailed description thereof is as described previously with reference to FIG. 7.

Meanwhile, if the first rotation angle does not exceed the first threshold angle or the second rotation angle does not exceed the second threshold angle, the smartwatch may not perform an additional operation. Alternatively, if the first rotation angle does not exceed the first threshold angle or the second rotation angle does not exceed the second threshold angle, the smartwatch may return to the previous step (S9040 or S9070).

According to an embodiment, since threshold angles for performing a command are differently provided according to the position and direction of rotation of a smartwatch, a smartwatch control method considering the physical characteristics of a user can be provided. As such, malfunction of the smartwatch can be prevented when performing a command through rotation of the smartwatch.

According to another embodiment, since a command corresponding to rotation of the smartwatch is determined according to a currently executed or displayed application, the disclosure can provide a more rapid and convenient smartwatch control method.

According to a further embodiment, since a command corresponding to an event is performed according to rotation of the smartwatch sensed within a predetermined period of time after the event is generated, the disclosure can provide a more intuitive and convenient smartwatch control method.

According to still another embodiment, since a command is performed according to rotation of the smartwatch when the rotation speed of the smartwatch exceeds a predetermined speed, malfunction of the smartwatch can be prevented.

While the disclosure has been described with reference to separate drawings for convenience, a new embodiment may be implemented by combining embodiments illustrated in the drawings. As needed, designing a computer-readable recording medium, in which a program for implementing the aforedescribed embodiments is recorded, is within the scope of the disclosure.

The smartwatch and the method for controlling the same are not limited to the configurations and methods of the exemplary embodiments set forth herein. The exemplary embodiments may be selectively combined in part or in whole to produce various embodiments.

While the disclosure has been particularly shown and described with reference to exemplary embodiments, it will be understood by those of ordinary skill in the art that various changes in form and details may be made without departing from the spirit and scope of the disclosure as defined by the following claims. Such modifications should not be individually understood from the technical spirit or prospect of the disclosure.

In addition, the smartwatch and the control method thereof according to the disclosure may be implemented as code that can be written on a processor-readable recording medium and thus read by a processor included in a networked device. The processor-readable recording medium may be any type of recording device in which data is stored in a processor-readable manner. The processor-readable recording medium may include, for example, a ROM, a RAM, a magnetic tape, a floppy disk, and an optical data storage device and may be implemented in the form of a carrier wave transmitted over the Internet. The processor-readable recording medium can be distributed over a plurality of computer systems connected to a network so that processor-readable code is written thereto and executed therefrom in a decentralized manner.

Further, the angles, velocities, and directions described in the disclosure may be interpreted as including substantial angles, velocities, and directions of a predetermined range as well as precise values thereof. That is, the angles, velocities, and directions in the disclosure may indicate substantial angles, velocities, and directions and include an error of a predetermined range.

Both a device and a method are described in the disclosure and descriptions thereof may be complementarily applied as necessary.

What is claimed is:

1. A smartwatch, comprising:
a tilt sensor unit configured to sense a tilt of the smartwatch;
a display unit configured to display visual information; and
a processor configured to control the tilt sensor unit and the display unit,
wherein the processor is further configured to:
determine a reference position of the smartwatch positioned on a user's wrist when the user is wearing the smartwatch,
acquire, using the tilt sensor unit, an outward rotation angle of the smartwatch on the wrist when the smartwatch on the wrist rotates in an outward direction from the determined reference position of the smartwatch based on an outward rotation of the wrist, and perform an outward command corresponding to the outward direction when the acquired outward rotation angle exceeds an outward threshold angle, and acquire, using the tilt sensor unit, an inward rotation angle of the smartwatch on the wrist when the smartwatch on the wrist rotates in an inward direction from the determined reference position of the smartwatch based on an inward rotation of the wrist, and perform an inward command corresponding to the inward direction when the acquired inward rotation angle exceeds an inward threshold angle, wherein the outward threshold angle is set to an angle different from the inward threshold angle to compensate for physical limitations associated with rotation of the wrist.

2. The smartwatch according to claim 1, wherein the reference position of the smartwatch is a state in which a screen of the display unit faces upwardly.

3. The smartwatch according to claim 1, wherein the reference position of the smartwatch is a state in which a screen of the display unit faces downwardly.

4. The smartwatch according to claim 1, wherein the reference position of the smartwatch is a state in which the processor detects that the user is viewing a screen of the display unit.

5. The smartwatch according to claim 1, further comprising an input sensor unit configured to sense an input to the smartwatch, wherein the processor is further configured to detect a worn state of the smartwatch on the user based on at least one input on a back of the smartwatch and input to a buckle of the smartwatch.

6. The smartwatch according to claim 1, wherein the processor is further configured to determine the outward command and the inward command according to a currently executed application type or a currently displayed application execution screen.

7. The smartwatch according to claim 1, wherein the outward command and the inward command are commands corresponding to each other.

8. The smartwatch according to claim 1, wherein the outward threshold angle is a relative angle of the inward threshold angle or the inward threshold angle is a relative angle of the outward threshold angle.

9. The smartwatch according to claim 1, wherein the outward direction is an upper direction of the display unit and the inward direction is a lower direction of the display unit.

10. The smartwatch according to claim 1, wherein, when an event occurs in the smartwatch, the processor is further configured to:

provide a notification regarding the event, and perform the outward command or the inward command corresponding to the notification according to a rotation of the smartwatch on the wrist when the smartwatch rotates within a predetermined period of time after the notification is provided.

11. The smartwatch according to claim 10, wherein the outward command or the inward command corresponding to the notification corresponds to either a disregard command or an execution command.

12. The smartwatch according to claim 1, further comprising a measurement unit configured to measure a rotation speed of the smartwatch, wherein the processor is further configured to:

acquire the outward rotation angle or the inward rotation angle, and the rotation speed when a rotation of the smartwatch is sensed, and perform the outward command or the inward command according to the rotation of the smartwatch when the acquired rotation speed exceeds a predetermined speed.

13. The smartwatch according to claim 1, further comprising a communication unit configured to transmit and receive data, wherein the processor is further configured to perform pairing between the smartwatch and an external device using the communication unit.

14. The smartwatch according to claim 13, wherein the processor is further configured to control the external device paired with the smartwatch according to a rotation of the smartwatch.

15. The smartwatch according to claim 1, further comprising a camera unit configured to capture an image, wherein the processor is further configured to detect an image of the user using the camera unit.

16. The smartwatch according to claim 15, wherein the processor is further configured to perform the outward command or the inward command according to the outward rotation angle or the inward rotation angle of the smartwatch when detecting the user's image.

17. The smartwatch according to claim 15, wherein the processor is further configured to provide a directional indicator indicating the outward direction or the inward direction.

18. A method for controlling a smartwatch including a display unit and a processor, comprising:

determining, by the processor, a reference position of the smartwatch positioned on a user's wrist when the user is wearing the smartwatch;

acquiring an outward rotation angle of the smartwatch on the wrist when the smartwatch on the wrist rotates in an outward direction from the determined reference position of the smartwatch based on an outward rotation of the wrist, and performing an outward command corresponding to the outward direction when the outward rotation angle exceeds an outward threshold angle; and acquiring an inward rotation angle of the smartwatch on the wrist when the smartwatch on the wrist rotates in an inward direction from the determined reference position of the smartwatch based on an inward rotation of the wrist, and performing an inward command corresponding to the inward direction when the inward rotation angle exceeds an inward threshold angle, wherein the outward threshold angle is set to an angle different from the inward threshold angle to compensate for physical limitations associated with rotation of the wrist.

19. The method according to claim 18, wherein the reference position of the smartwatch is a state in which a screen of the display unit faces upwardly.

20. The method according to claim 18, wherein the reference position of the smartwatch is a state in which a screen of the display unit faces downwardly.

21. The method according to claim 18, wherein the reference position of the smartwatch is a state in which the processor detects that the user is viewing a screen of the display unit.

* * * * *